(12) United States Patent
Sajdak et al.

(10) Patent No.: US 10,215,057 B2
(45) Date of Patent: Feb. 26, 2019

(54) ROTOR TURNING SYSTEM AND METHOD

(71) Applicants: Lukasz Sajdak, Raszyn (PL); General Electric Company, Schenectady, NY (US)

(72) Inventors: Lukasz Sajdak, Raszyn (PL); Anthony Paul Curran, Kinsale (IE); John William Herbold, Fountain Inn, SC (US); Michal Wojciech Wnuk, Warsaw (PL)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 14/991,186

(22) PCT Filed: May 13, 2015

(86) PCT No.: PCT/PL2015/050015
§ 371 (c)(1),
(2) Date: Jan. 8, 2016

(87) PCT Pub. No.: WO2016/182461
PCT Pub. Date: Nov. 17, 2016

(65) Prior Publication Data
US 2018/0051593 A1   Feb. 22, 2018

(51) Int. Cl.
*F01D 25/28* (2006.01)
*F01D 25/34* (2006.01)
(Continued)

(52) U.S. Cl.
CPC ........... *F01D 25/34* (2013.01); *F01D 25/285* (2013.01); *F16H 35/18* (2013.01);
(Continued)

(58) Field of Classification Search
CPC .. F01D 25/34; F05D 2220/32; F05D 2220/72; F05D 2260/4021;
(Continued)

(56) References Cited

U.S. PATENT DOCUMENTS

| 2,138,327 | A | 11/1938 | Richards |
| 3,327,396 | A | 6/1967 | Waddell |

(Continued)

FOREIGN PATENT DOCUMENTS

| DE | 7243023 U | 8/1974 |
| EP | 2161416 A2 | 3/2010 |

(Continued)

OTHER PUBLICATIONS

PCT Search Report and Written Opinion issued in connection with corresponding PCT Application No. PCT/PL2015/050015 dated Apr. 18, 2016.

*Primary Examiner* — Igor Kershteyn
*Assistant Examiner* — Christopher R Legendre
(74) *Attorney, Agent, or Firm* — Ernest G. Cusick; Hoffman Warnick LLC

(57) ABSTRACT

A rotor turning system for turning a rotor is provided. The system may include a rotary driver including a rotating drive shaft. A removable rotor grasping element is configured to frictionally grasp at least a portion of an exterior circumference of a portion of the rotor. A drive linkage couples the rotating drive shaft to the rotor grasping element to impart a torque to the rotor with the rotor grasping element to turn the rotor. A rotor grasping element is also provided for grasping a substantially smooth exterior surface of a rotor to allow for turning of the rotor. A related method is also provided.

20 Claims, 7 Drawing Sheets

(51) Int. Cl.
*F16H 35/18* (2006.01)
*F16H 7/08* (2006.01)

(52) U.S. Cl.
CPC ...... *F05D 2220/32* (2013.01); *F05D 2230/72* (2013.01); *F05D 2260/4021* (2013.01); *F05D 2260/4022* (2013.01); *F16H 7/08* (2013.01)

(58) Field of Classification Search
CPC .... F05D 2260/4022; F16H 7/02; F16H 7/023; F16H 7/06; F16H 7/08; F16H 35/18; B25B 17/00; Y10T 74/18832; Y10T 74/1884; Y10T 74/19102; Y10T 74/18152
See application file for complete search history.

(56) References Cited

U.S. PATENT DOCUMENTS

| | | | |
|---|---|---|---|
| 4,367,993 A | 1/1983 | Meigs | |
| 5,678,452 A | 10/1997 | Frazier | |
| 7,275,508 B2 | 10/2007 | Pattullo | |
| 7,958,797 B2 * | 6/2011 | Aust | F03D 80/50 269/32 |
| 8,210,810 B2 * | 7/2012 | Egoshi | F03D 1/06 416/1 |
| 8,348,793 B2 * | 1/2013 | Neary | F16H 7/08 474/111 |
| 8,689,661 B2 | 4/2014 | Maltby | |
| 2006/0230761 A1 | 10/2006 | Robertson et al. | |
| 2011/0142647 A1 * | 6/2011 | Husken | F03D 7/0268 416/159 |
| 2011/0260461 A1 | 10/2011 | Egoshi et al. | |
| 2012/0063883 A1 | 3/2012 | Bei et al. | |
| 2014/0216199 A1 | 8/2014 | Maltby | |
| 2018/0051593 A1 * | 2/2018 | Sajdak | F01D 25/34 |

FOREIGN PATENT DOCUMENTS

| | | |
|---|---|---|
| EP | 2161416 A3 | 4/2013 |
| GB | 1024895 A | 4/1966 |

* cited by examiner

ROTOR TURNING SYSTEM AND METHOD

BACKGROUND OF THE INVENTION

The disclosure relates generally to turbo-machinery, and more particularly, to a rotor turning system and method for turning a rotor, for example, when there is no turning gear coupled to the rotor.

Turbomachines are used to generate power, for example, in the form of electricity when coupled to an electric generator. Turbomachines may take a variety of forms such as a gas turbine, jet engine or steam turbine. Each form of turbomachine may include one or more turbine components that are driven by a working fluid such as combustion gases or steam to turn a rotor coupled to the turbine component. In many cases, the rotor is coupled to numerous turbine components, and extends to a generator for generating electricity. The generator may also provide turning gear for turning the rotor during startup of the particular turbine system.

During maintenance of a turbomachine, the rotor is uncoupled from various components to allow access to the components and the rotor. For example, in a gas turbine system, the gas turbine component is uncoupled from the generator during maintenance. In this setting, there is no generator turning gear to turn the rotor even though some turning of the rotor may be necessary during maintenance. The torque necessary to turn the rotor typically must be sufficient to not just turn the rotor but also the turbine component, and possibly the generator rotor, that may remain coupled to the rotor (e.g., by a load coupling shaft). One approach to provide turning includes employing a pinion gear integrally built into or added to an end of a rotor, and a mating geared drive to turn the rotor using the pinion gear. This arrangement requires the rotor to be made with the pinion gear or the pinion gear must be permanently affixed to the end of the rotor. In most cases however the rotor is not manufactured or readily capable of having the pinion gear mounted to an end thereof. In most cases however the rotor only has a smooth exterior surface, which may be presented on a flange that extends radially from a remainder of the rotor. As a result, during maintenance, workers typically have to employ chain falls, 'come-alongs' or cranes to assist in turning the rotor. This approach to turning a rotor is not a controlled method and may inhibit providing quality maintenance.

BRIEF DESCRIPTION OF THE INVENTION

A first aspect of the disclosure provides a rotor turning system, comprising: a rotary driver including a rotating drive element; a removable rotor grasping element configured to frictionally grasp at least a portion of a substantially smooth exterior circumference of a portion of the rotor; and a drive linkage coupling the rotating drive element to the rotor grasping element to impart a torque to the rotor grasping element to turn the rotor.

A second aspect of the disclosure provides a removable grasping element for a rotor, the element comprising: at least one grasping member configured to surround the at least a portion of the substantially smooth exterior circumference of the rotor, each grasping member including a band body having a coupler for coupling adjacent ends thereof together and a friction element on an inner surface thereof to frictionally grasp a portion of the rotor; a plurality of drive linkage engaging members configured to collectively surround the at least a portion of the substantially smooth exterior circumference of the rotor, each drive linkage engaging member including a coupler for coupling with an adjacent drive linkage engaging member and a drive linkage engaging portion configured for engagement by a drive linkage for turning the rotor; and a plurality of member couplers for coupling at least one grasping member to at least one sprocket member.

A third aspect of the disclosure provides a method of turning a rotor, the method comprising: frictionally grasping at least a portion of an exterior circumference of the rotor with a removable rotor grasping element; coupling a drive linkage to an exterior of the rotor grasping element and to a rotating drive shaft of a rotary driver; and turning the rotor by operating the rotary driver to move the drive linkage to impart a torque to the rotor with the removable rotor grasping element.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As indicated above, the disclosure provides a rotor turning system and method for turning a rotor, e.g., when there is no turning gear coupled to the rotor. A removable rotor grasping element is also provided for grasping a substantially smooth exterior circumferential surface of a rotor to allow for turning of the rotor.

Figure 1:
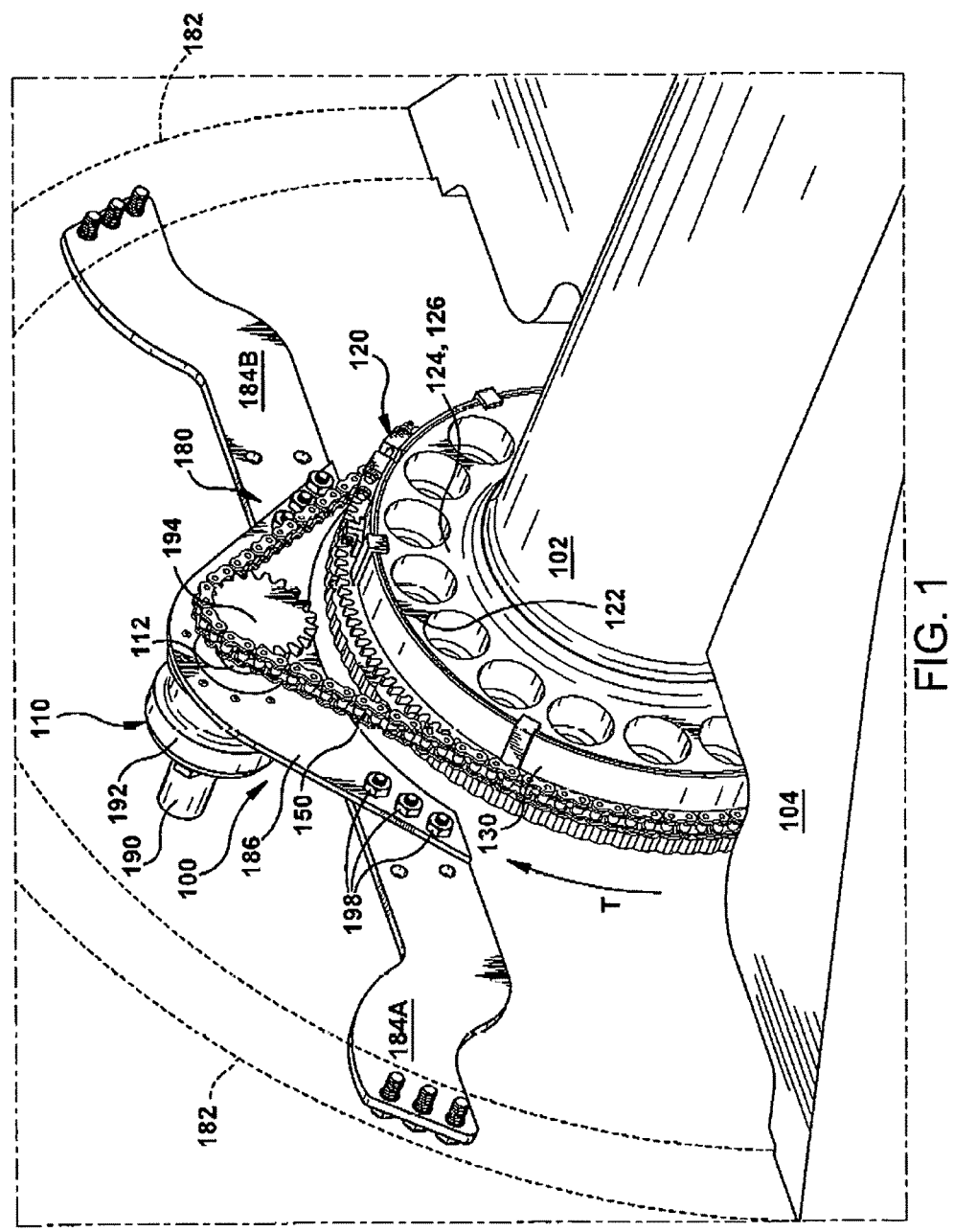
FIG. 1 shows a first perspective view of a rotor turning system according to embodiments of the invention.
Figure 2:
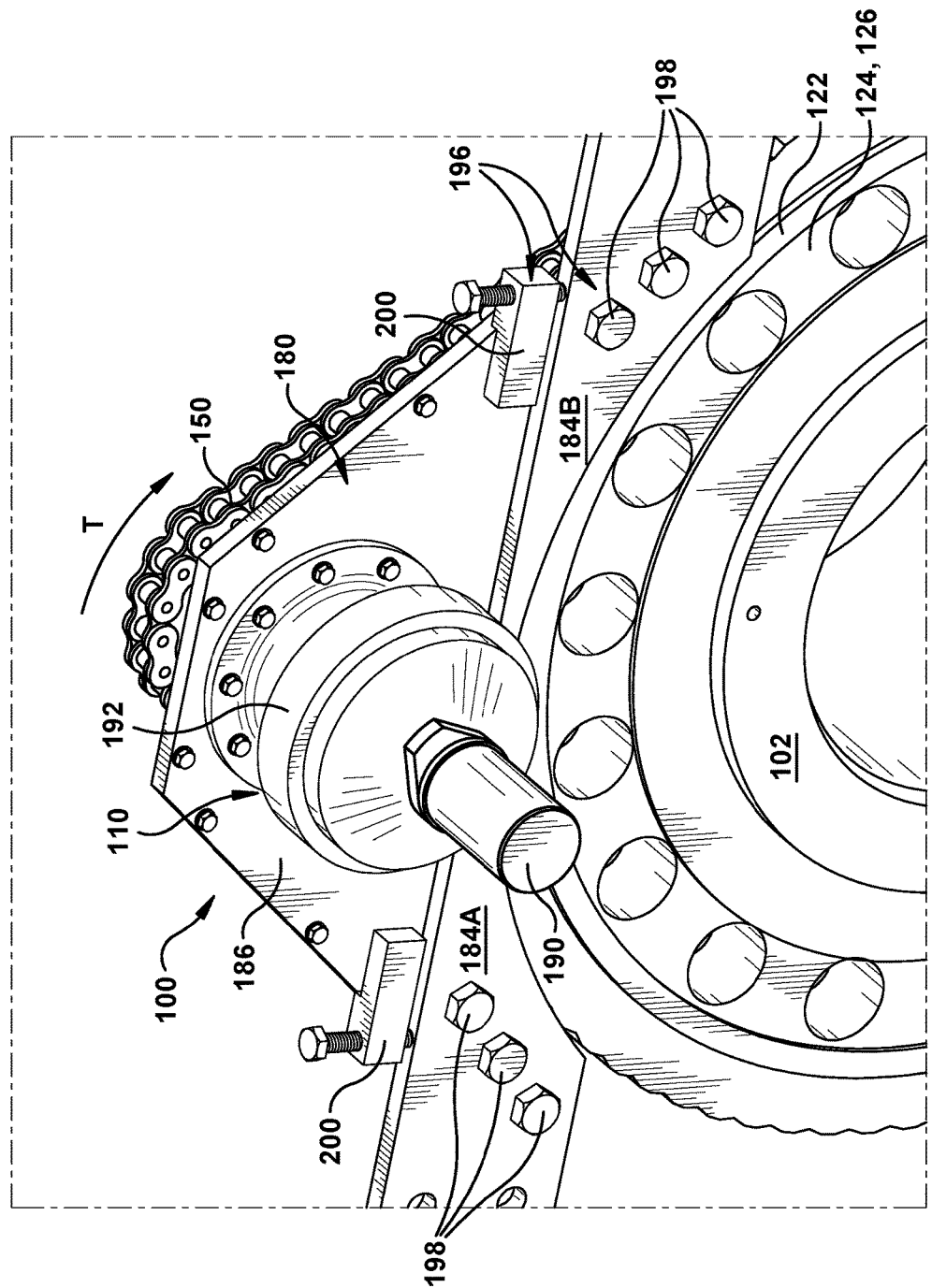
FIG. 2 shows a second perspective view of a rotor turning system according to embodiments of the invention.

Referring to the drawings, FIG. 1 shows a first perspective view of a rotor turning system 100, and FIG. 2 shows a second perspective view of rotor turning system 100 according to embodiments of the invention. In the drawings, a rotor 102 is shown in a position and state ready for maintenance and/or inspection. The maintenance and/or inspection may include any now known or later developed process for maintaining and/or inspecting rotor 102, e.g., imaging, resurfacing, polishing, resizing, etc. Rotor 102 is shown exposed in a lower casing or bearing 104 of a turbomachine, i.e., with at least part of an upper casing or bearing removed. As understood in the art, in an operative state, rotor 102 may extend through a gas and/or steam turbine and a generator, but is illustrated here decoupled from the generator. It may still be coupled to the turbine(s). As also understood, the generator would typically provide a turning gear for the rotor. Consequently, in this state, rotor 102 is incapable of being turned in a conventional fashion. It is understood, however, that the teachings of the invention are not solely applicable to the situation where the generator is decoupled and may be employed for turning rotor 102 at any time it is exposed. Rotor 102 includes a substantially smooth exterior circumference, which may include a number of different surfaces at different radial positions relative to an axis of the rotor and at different axial positions of the rotor.

In order to provide a controlled turning operation, rotor turning system 100 includes a rotary driver 110 including a rotating drive element 112 (FIG. 1) for turning rotor 102. As shown in FIG. 1, a removable rotor grasping element 120 is configured to frictionally grasp at least a portion of a substantially smooth exterior circumference 122 of a portion 124 of rotor 102, and a drive linkage 150 couples rotating drive element 112 to rotor grasping element 120 to impart a torque (T) to rotor grasping element 120 to turn rotor 102.

Figure 6:
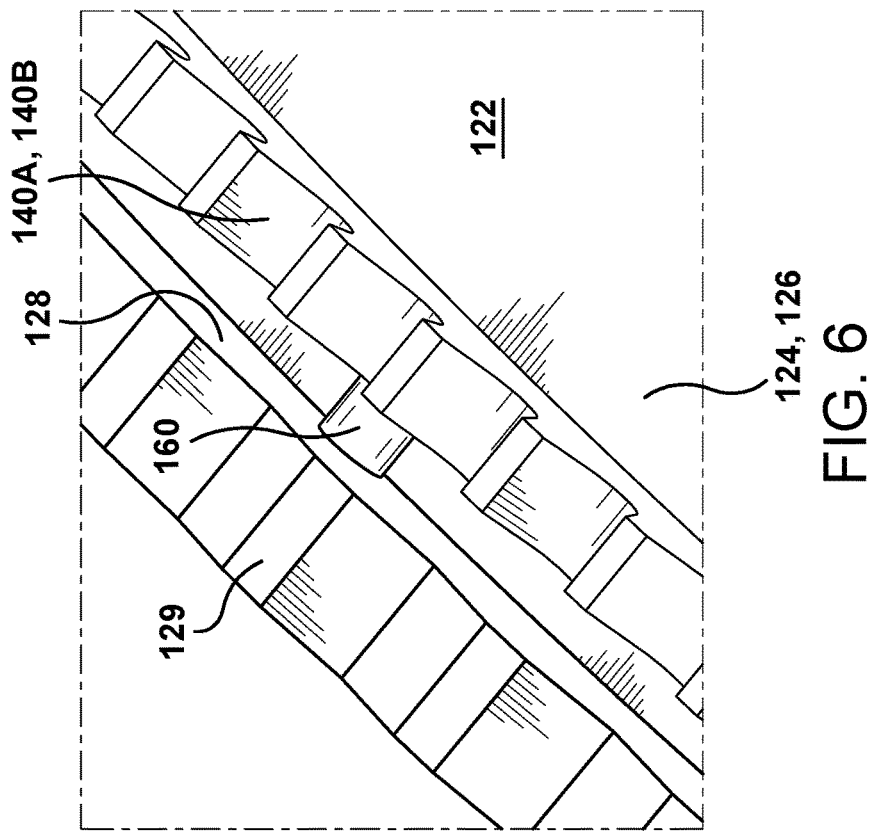
FIGS. 5 and 6 both show enlarged perspective views of one form of linkage engaging member according to embodiments of the invention.
Figure 5:
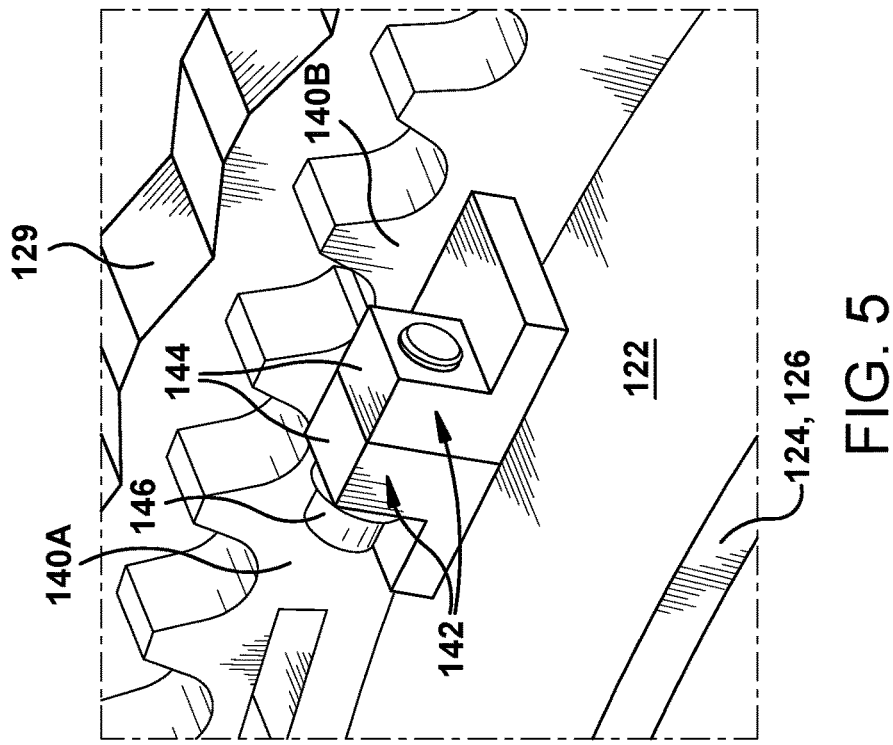

In the example shown, portion 124 includes a flange 126 extending radially from a remainder of rotor 102, and the exterior circumference of flange 126 is substantially smooth (see FIGS. 5 and 6). As used herein, "substantially smooth" does not necessarily indicate any particular parameter value of smoothness but rather that rotor 102 is free of any physical characteristic, such as a surface roughness, a physical element, etc., that can be readily gripped, engaged, grasped, etc., to cause turning. In one embodiment, as shown best in FIG. 3, rotor 102 also includes an axial face 128 on a speed indicator ring 129 of rotor 102; however, this may not be present in all embodiments. As will be apparent from the description herein, portion 124 may include practically any exterior circumference of rotor 102.

Figure 3:
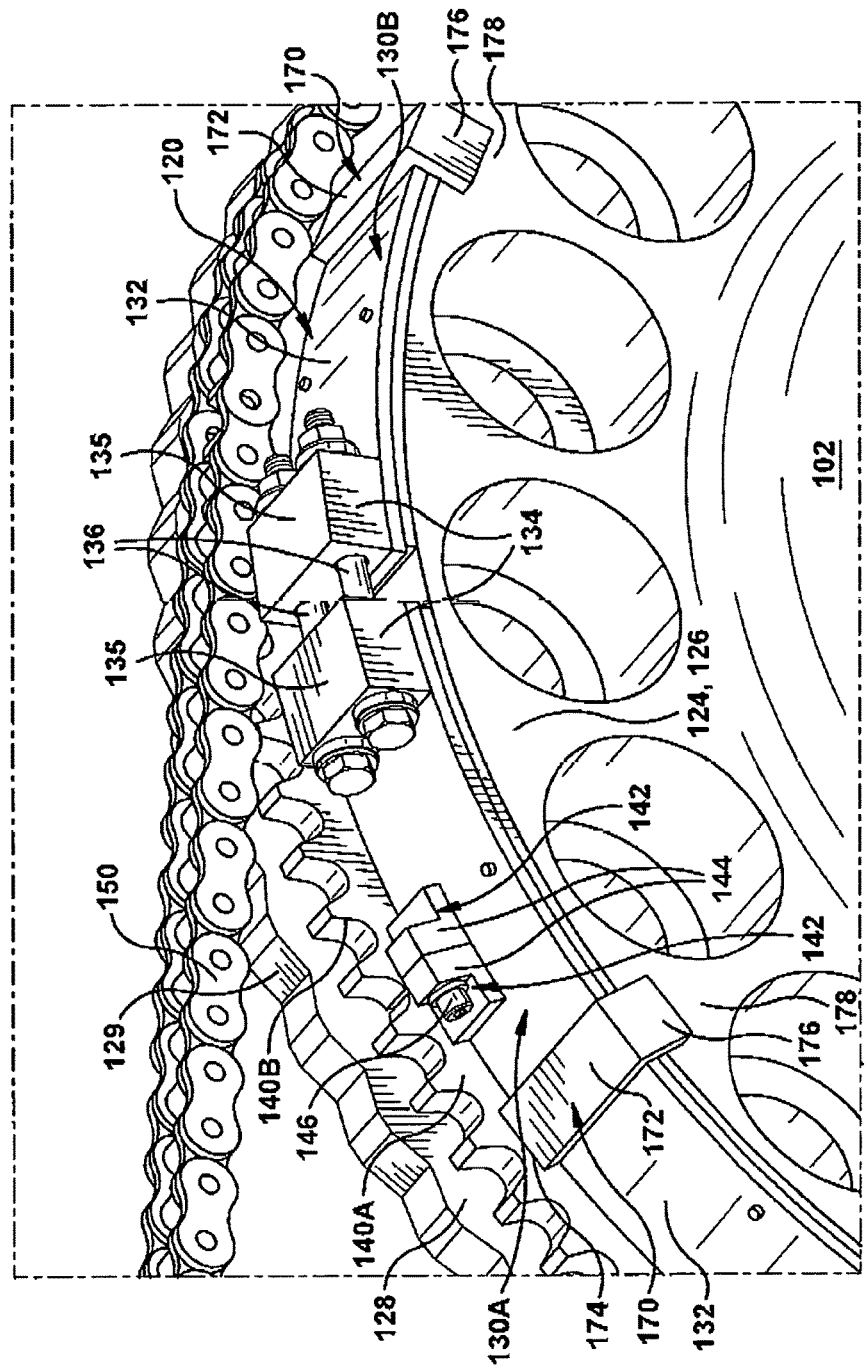
FIG. 3 shows a detailed perspective view of a portion of a removable rotor grasping element according to embodiments of the invention.

Referring to FIGS. 1 and 3 collectively, removable rotor grasping element 120 may include at least one grasping member 130 configured to surround at least a portion of the substantially smooth exterior circumference of rotor 102. Each grasping member 130 acts to frictionally engage and grasp portion 124 of rotor 102 such that when a torque T (FIGS. 1 and 2) is applied thereto, rotor 102 turns. In FIG. 1, a single grasping member 130 extends about at least portion 124 of exterior circumference of rotor 102, e.g., flange 126. In contrast, in FIG. 3, a plurality of grasping members 130A, 130B surround at least a portion 124 of the exterior circumference. That is, grasping members 130A, 130B each have a substantially semi-circular shape such that they extend about 175-178° about flange 126, and are coupled together to surround portion 124 (occluded at bottom of FIGS.). Each grasping member 130 or 130A, 130B may include a band body 132 having a coupler 134 for coupling adjacent ends thereof together. Each band body 132 may be made of a metal having sufficient strength to withstand the torque forces applied thereto, and may be curved to mate with at least a portion 124 of an exterior circumference of rotor 102, e.g., at flange 126. In FIG. 1, grasping member 130 includes one coupler 134, and in FIG. 3, each grasping member 130A, 130B may include a pair of couplers 134 (lower one obstructed by rotor 102). As illustrated, couplers 134 may include material blocks 135 on each end of band bodies 132 that may be coupled by an appropriate fastener(s) 136, e.g., threaded fastener(s), nuts and bolts. The ends of each band body 132 may be spaced sufficiently to allow couplers 134 to apply any desired amount of circumferential tension thereto to ensure grasping of rotor 102. It is emphasized that couplers 134 may take a variety of alternative forms such as but not limited to: mating and locking male-female connectors, come-alongs, cables, clamping fasteners, etc.

Figure 4:
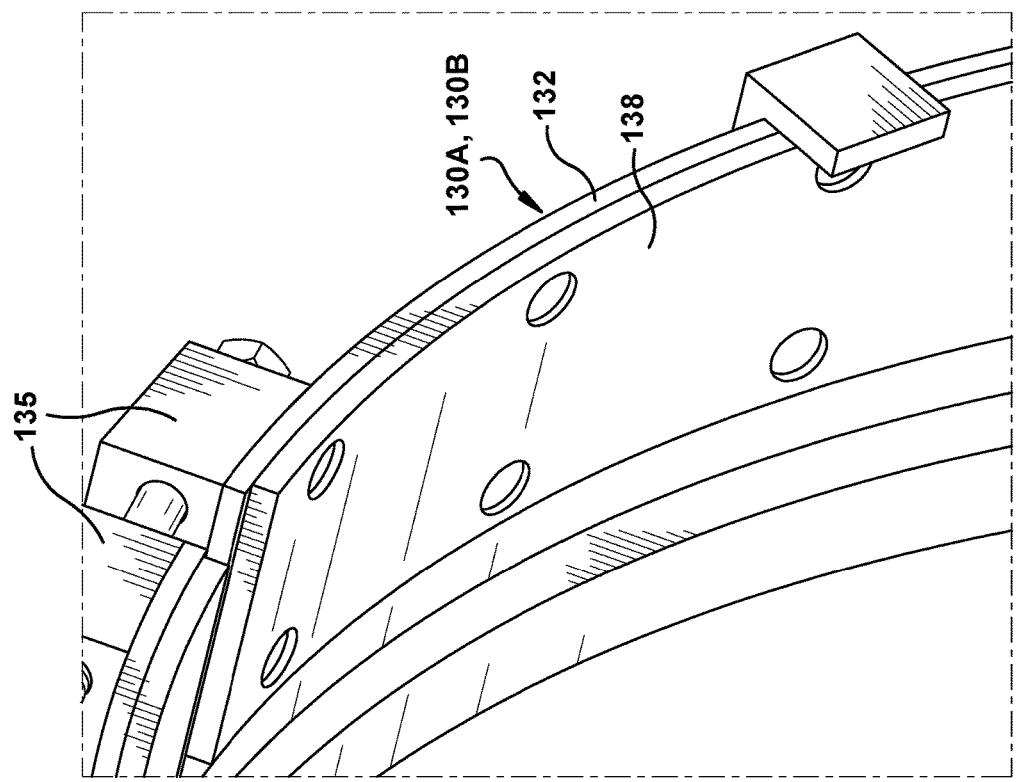
FIG. 4 shows an enlarged perspective view of a friction element according to embodiments of the invention.

As shown best in the detailed perspective view of FIG. 4, each grasping member 130 or 130A, 130B also includes a friction element 138 on an inner surface thereof, i.e., inside band body 132, to frictionally grasp a respective portion of rotor 102. Each friction element 138 may include any now known or later developed material capable of frictionally engaging and grasping exterior circumference of rotor 102, i.e., when sufficient circumferential tension is applied to band body 132. In one example, friction element 138 may include a brake pad material, i.e., a material similar to automotive brake pads such as but not limited to semi-metallic materials, organic materials, or ceramics.

Removable rotor grasping element 120 may also include a plurality of drive engaging members configured to collectively surround at least a portion 124 of substantially smooth exterior circumference of rotor 102. In one embodiment, shown in FIGS. 1-3 and 5-7, drive linkage 150 takes the form of a chain and the drive engaging members take the form of a plurality of sprocket members 140A, 140B configured to collectively surround at least a portion of the substantially smooth exterior circumference of rotor 102. As will be described herein relative to FIG. 8, however, drive linkage 150 may take other forms such as a drive belt 250 in which case drive engaging members 240A, 240B take the form of portions of a drive belt pulley. While the description will be made relative to two particular types of drive linkage 150, 250, it is understood that the teachings are equally applicable to other types of drive linkages such as but not limited to: a set of mating gears, a traction element like a rubber wheel that engages an exterior of band body 132, etc.

Hereafter, the description shall be mostly of drive engaging members 140A, B of FIGS. 1-3 and 4-7 embodiments; however, the teachings are equally applicable to drive engaging members 240A, B of the FIG. 8 embodiment, which will be described thereafter. Each drive engaging member 140A, B may be made of a metal having sufficient strength to withstand the torque and tangential forces applied thereto, and may be curved to mate with at least a portion 124 of an exterior circumference of rotor 102, e.g., at flange 126. Each drive engaging member 140, 240 includes a coupler 142 for coupling with an adjacent drive engaging member. As illustrated, couplers 142 may include material blocks 144 on each end thereof that may be coupled by appropriate fastener(s) 146, e.g., threaded fastener(s), nuts and bolts. The position of ends of drive engaging members 140A, B are configured to be spaced sufficiently to allow couplers 142 to position them to provide a substantially contiguous drive engaging member, i.e., such that any drive linkage 150 engaging therewith remains engaged with typical wear during operation. Couplers 142 may apply any desired amount of circumferential tension thereto to ensure such functionality. It is emphasized that couplers 142 may take a variety of alternative forms such as but not limited to: mating and locking male-female connectors, come-alongs, cables, clamping fasteners, etc. In one embodiment, shown in FIG. 6, a spacer 160 may position drive engaging member(s) 140A, 140B from axial face 128 of speed indicator ring 129 of rotor 102 to protect, among other things, speed indicator ring 129. Any number of spacers 160 may be included, and they may be made of any material capable of withstanding the working environment, e.g., metal, rubber, hard plastic, etc.

With regard to the numbers of grasping members 130 and drive engaging members 140, in one embodiment, grasping member(s) 130 and drive engaging members 140 may each collectively surround an entirety of the substantially smooth exterior circumference of rotor 102. For example, where two grasping members 130A, 130B and two drive engaging members 140A, 140B are employed, grasping members 130A, 130B and drive engaging members 140A, 140B may each include a pair of substantially semi-circular members. It is also emphasized, however, that while the drawings illustrate the respective members surrounding a substantial portion of the exterior circumference, depending on the amount of turn required of rotor 102, the member(s) need not surround all of the exterior circumference. In addition, while embodiments with a single and two grasping members and two drive engaging members have been illustrated, more than two grasping members and more than two drive engaging members may also be employed and coupled together in a similar fashion as that described herein.

Figure 7:
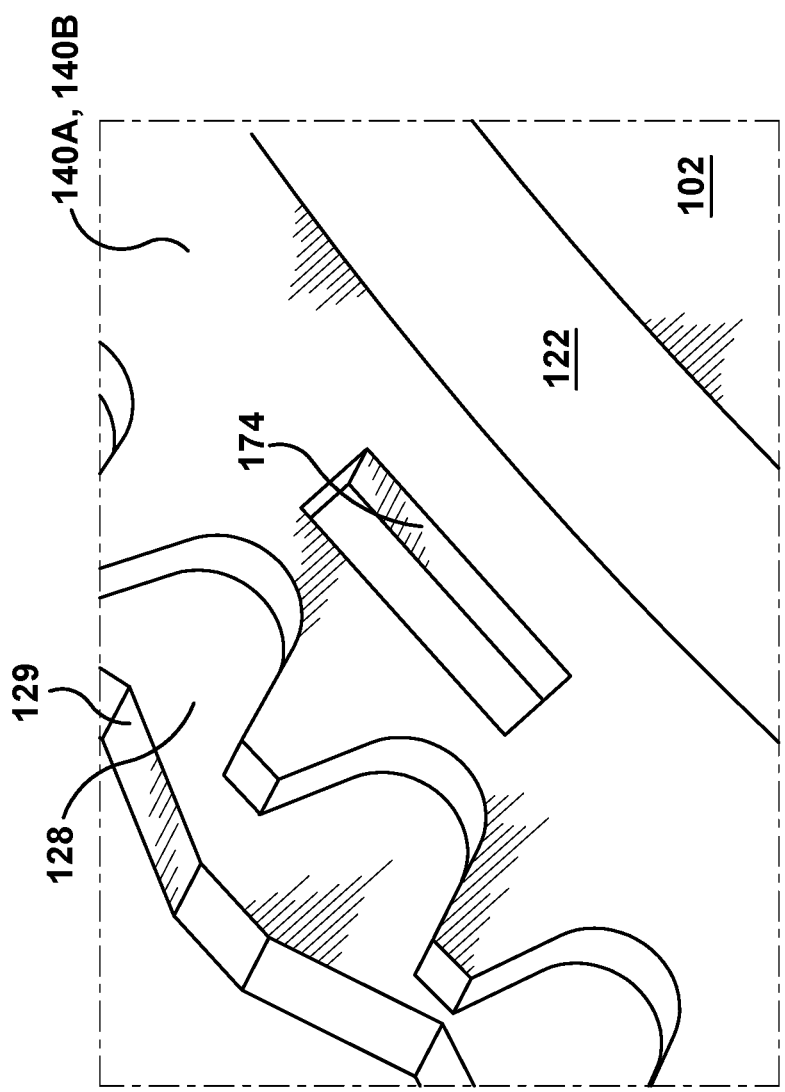
FIG. 7 shows a detailed view of a seat in a sprocket member according to embodiments of the invention.

With reference to FIG. 3, removable rotor grasping element 120 may also include a plurality of member couplers 170 for coupling at least one grasping member 130 or 130A, 130B to at least one drive engaging member 140A, 140B. In one embodiment, each member coupler 170 may include a mating female-male element 172, 174 circumferentially affixing a position of a respective drive engaging member with a corresponding grasping member. In one embodiment, mating female-male elements may include a bracket 172 coupled to a respective band body 132, e.g., by welding, etc., and a corresponding seat 174 in a respective drive engaging member 140A, B. As shown in FIG. 7, although not necessary, seat(s) 174 may extend through each drive engaging member 140A, 140B. As shown in FIG. 6, spacers 160 (FIG. 6) position at least one drive engaging member from axial face 128, and each bracket 172 engages a respective seat 174. Although not necessary in all instances, in one embodiment, each member coupler 170 may also include a positioning stop 176 to engage an axially facing edge 178 of rotor 102, i.e., flange 126, to positively, axially position the grasping members relative to the drive engaging members and rotor 102. In the fashion described above, each grasping member 130, 130A, 130B is circumferentially coupled to at least one drive engaging member 140A, B (similarly in FIG. 8 with members 240A, 240B) such that turning of either leads to turning of the other. Any number of female-male elements 172, 174 may be employed as necessary to ensure the grasping members move with the drive engaging members, and female-male elements 172, 174 maybe adjusted for a particular rotor 102 to ensure proper alignment and engagement. Although a particular mechanism has been disclosed for circumferentially affixing grasping members and drive engaging members, it is emphasized that a large variety of alternatives may be employed such as but not limited to: nuts and bolts similar to blocks 135, 144, screws, circumferentially sliding male-female connectors, other shaped brackets and seats, etc. In an alternative embodiment, drive engaging members 140A, 140B could be permanently fixed to grasping members 130A, 130B such that grasping members 130A, 130B retain their ability to be selectively adjusted, e.g., each member 140A, 140B could simply be welded at one end thereof to a respective grasping member 130A, 130B and be sized so as to not interfere when grasping members 130A, 130B are pulled together to grasp rotor 102.

Returning to FIGS. 1 and 2, as noted above, rotary driver 110 includes rotating drive element 112 (FIG. 1) for turning rotor 102. As shown in FIGS. 1 and 2, rotary driver 110 may include a motor 190 such as but not limited to one of: a hydraulic motor, an electric motor, a pneumatic motor and a combustion engine. Rotating drive element 112 may be coupled directly to motor 190 or may be coupled to motor 190 (as shown) by a transmission 192, which may be employed to control turning and/or braking of rotor 102. Transmission 192 may include any appropriate transmission for the motor and torque employed. In one example, transmission 192 may include a planetary reduction unit equipped with a hydraulic brake with oil-bath disks, expressly designed for static or parking braking. During operation, a hydraulic pump (not shown) may apply pressure which switches off the brake, in which case the brake starts working immediately and stops the turning. Other forms of transmission are also possible.

In one embodiment, as shown in FIGS. 1-3, where drive linkage 150 includes a chain, a linkage drive element 194 may take the form of a drive sprocket coupled to rotating drive element 112. Drive sprocket 194 is sized to accommodate drive linkage 150 in the form of a particularly sized chain (as are sprocket members 140A, 140B). In this embodiment, drive linkage 150 may include a chain operatively coupled to linkage drive element 194 in the form of a drive sprocket and at least one of sprocket members 140A, 140B. As shown in FIG. 1, in one embodiment, rotary driver 110 may be supported by a rotary driver support 180 positioning it relative to a fixed support 182 such as a casing of rotor 102 or other fixed support. Rotary driver support 180 may include any now known or later developed mechanisms for fixing rotary driver 110 relative to rotor 102. In the embodiment illustrated, support 180 includes a pair of laterally extending arms 184A, 184B configured to be mounted to fixed support 182, e.g., by bolts, and a driver support arm 186 for supporting the working parts of rotary driver 110 relative to arms 184A, 184B. Arms 184A, 184B and driver support arm 186 may be coupled in any fashion, e.g., integral formation, welding, bolts (shown).

In one embodiment, an adjustable tensioner 196 may be provided for adjusting a tension in drive linkage 150. Adjustable tensioner 196 may include any now known or later developed drive linkage tensioning device. In the example shown, adjustable tensioner 196 may be provided by selective, adjustable, vertical positioning of driver support arm 186, and hence linkage drive element 194, relative to mounting of arms 184A, 184B and rotor 102, e.g., by slotted openings in the arms allowing selective, relative vertical movement of support arm 186 relative to arms 184A, 184B by bolts 198. Finer tensioning adjustment may be provided prior to fastening by bolts 198 by a threaded adjuster(s) 200 coupled to driver support arm 186.

Figure 8:
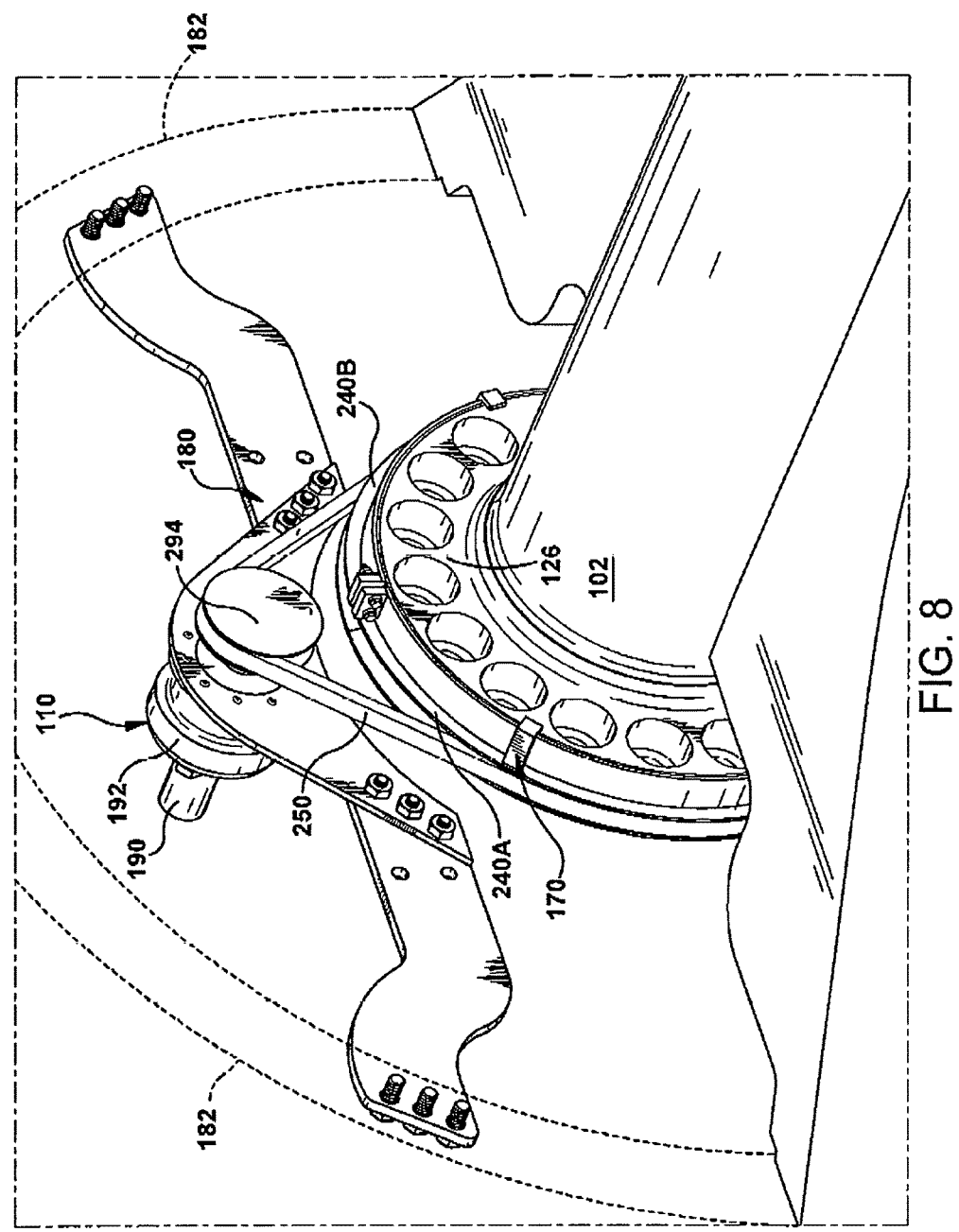
FIG. 8 shows a perspective view of an alternative embodiment of a rotor turning system.

Referring to FIG. 8, in an alternative embodiment, drive linkage 150 may take the form of a drive belt 250. In this case, sprocket members 140A, 140B would be replaced with drive belt pulley members 240A, 240B that are structured substantially similar to members 140A, 140B except the sprockets are replaced with a drive belt seat, as illustrated. Further, linkage drive element 194 would take the form of a drive belt pulley 294. Otherwise, the FIG. 8 embodiment is substantially similar to that of FIGS. 1-3 and 5-7.

In operation, rotor 102 is exposed according to conventional techniques. As shown in FIG. 1, driver support 180 is coupled to fixed support 182, e.g., by bolts, and driver support arm 186 along with motor 190, transmission 192 (if provided), rotary drive element 112 and linkage drive element 194 are mounted, as illustrated. Next, at least a portion 124 of an exterior circumference of rotor 102 is frictionally grasped with removable rotor grasping element 120. In one embodiment, drive engaging members such as sprocket members 140A, 140B (FIGS. 1-3 and 5) or drive belt pulley members 240A, 240B (FIG. 8) are positioned about flange 126 and coupled together using couplers 142. Spacer(s) 160 may be employed to position drive engaging members 140, 240 from axial face 128. Grasping member(s) 130 or 130A, 130B are then placed onto flange 126 such that bracket(s) 172 engage in seat(s) 174, thus circumferentially fixing drive engaging members 140, 240 with the grasping member(s). Grasping member 130 or members 130A, 130B may then be coupled together using couplers 134, applying enough circumferential tension to ensure that when removable rotor grasping element 120 is turned, rotor 102 also turns.

Drive linkage 150 is then coupled to an exterior of rotor grasping element 120, e.g., via sprocket members 140A,B (FIGS. 1 and 2) or drive belt pulley members 240A,B, and to rotating drive shaft 112 of rotary driver 110 by linkage drive element 194 in the form of a drive sprocket or belt drive pulley, respectively. Tension of drive linkage 150 may be adjusted using adjustable tensioner 196, as described herein. Rotor may then be turned by operating rotary driver 110 to move drive linkage 150 to impart a torque to rotor 102 with removable rotor grasping element 120. Transmission 192 (where provided) and/or motor 190 may be operated to control the turning.

As is apparent, rotor turning system 100 allows rotor 102 to be turned for inspection and required repair/maintenance in a controlled manner. System 100 may be readily mounted and un-mounted and used for a number of rotors 102 in different locations, and having different sizes. System 100 makes the turning process more controlled, reduces time variation, and speeds the task. It also removes the need for any type of crane or chain fall, and thus improves safety by eliminating the improvised solutions. System 100 can be employed with any type of rotor 102 with or without pinions on an end thereof. System 100 also provides continuous rotor turning, so it can be used during turbine alignment, if desired.

The foregoing drawings show some of the processing associated according to several embodiments of this disclosure. It should also be noted that in some alternative implementations, the acts noted in the drawings may occur out of the order noted or, for example, may in fact be executed substantially concurrently or in the reverse order, depending upon the act involved. Also, one of ordinary skill in the art will recognize that additional processing may be added.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A rotor turning system for a rotor, comprising:
a rotary driver including a rotating drive element;
a removable rotor grasping element configured to frictionally grasp at least a portion of a substantially smooth exterior circumference of the rotor, the removable rotor grasping element including at least two grasping members configured to surround the at least a portion of the substantially smooth exterior circumference of the rotor, each grasping member of the at least two grasping members including a band body having a coupler for coupling adjacent ends of the at least one grasping member together and a friction element on an inner surface of the at least one grasping member to frictionally grasp the at least a portion of the substantially smooth exterior circumference of the rotor;
a plurality of drive linkage engaging members configured to collectively surround the at least a portion of the substantially smooth exterior circumference of the rotor, each drive linkage engaging member of the plurality of drive linkage engaging members including a coupler for coupling with an adjacent drive linkage engaging member of the plurality of drive linkage engaging members;
a plurality of member couplers for coupling the at least two grasping members to at least one drive linkage engaging member of the plurality of drive linkage engaging members; and
a drive linkage coupling the rotating drive element to the removable rotor grasping element to impart a torque to the removable rotor grasping element to turn the rotor.

2. The rotor turning system of claim 1, wherein the at least two grasping members and the plurality of drive linkage engaging members each collectively surround an entirety of the substantially smooth exterior circumference of the rotor.

3. The rotor turning system of claim 1, wherein the at least two grasping members and the plurality of drive linkage engaging members each include a pair of substantially semi-circular members.

4. The rotor turning system of claim 1, wherein each member coupler of the plurality of member couplers includes a mating female-male element circumferentially affixing a position of a respective drive linkage engaging member of the plurality of drive linkage engaging members with a corresponding grasping member of the at least two grasping members.

5. The rotor turning system of claim 1, wherein the rotating drive element includes a drive sprocket, and the drive linkage includes a chain operatively coupled to the drive sprocket and at least one of the plurality of drive linkage engaging members.

6. The rotor turning system of claim 1, wherein each member coupler of the plurality of member couplers further includes a positioning stop to engage an axially facing edge of the rotor.

7. The rotor turning system of claim 1, wherein each friction element includes a brake pad material.

8. The rotor turning system of claim 1, further comprising a spacer positioning at least one drive linkage engaging member of the plurality of drive linkage engaging members from an axial face of a portion of the rotor.

9. The rotor turning system of claim 1, further comprising a rotary driver support positioning the rotary driver relative to a casing of the rotor.

10. The rotor turning system of claim 1, further comprising an adjustable tensioner for adjusting a tension in the drive linkage.

11. The rotor turning system of claim 1, further comprising a transmission between the rotary driver and the rotating drive element.

12. The rotor turning system of claim 1, wherein the rotor includes a flange, and exterior circumference of the flange is the substantially smooth exterior circumference of the rotor.

13. The rotor turning system of claim 1, wherein the rotary driver includes one of: a hydraulic motor, an electric motor, a pneumatic motor and a combustion engine.

14. The rotor turning system of claim 1, wherein each drive linkage engaging member of the plurality of drive linkage engaging members includes a sprocket member.

15. A removable grasping element for a rotor, the element comprising:
   at least two grasping members configured to surround the at least a portion of the substantially smooth exterior circumference of the rotor, each grasping member of the at least two grasping members including a band body having a coupler for coupling adjacent ends of the at least two grasping members together and a friction element on an inner surface of the at least two grasping members to frictionally grasp a portion of the rotor;
   a plurality of drive linkage engaging members configured to collectively surround the at least a portion of the substantially smooth exterior circumference of the rotor, each drive linkage engaging member of the plurality of drive linkage engaging members including a coupler for coupling with an adjacent drive linkage engaging member and a drive linkage engaging portion configured for engagement by a drive linkage for turning the rotor; and
   a plurality of member couplers for coupling at least one grasping member of the at least two grasping members to at least one drive linkage engaging member of the plurality of drive linkage engaging members.

16. The element of claim 15, wherein the at least two grasping members and the plurality of drive linkage engaging members each collectively surround an entirety of the substantially smooth exterior circumference of the rotor.

17. The element of claim 15, wherein each drive linkage engaging member of the plurality of drive linkage engaging members includes a sprocket member.

18. The element of claim 15, wherein each member coupler of the plurality of member couplers includes:
   a mating female-male element circumferentially affixing a position of a respective drive linkage engaging member of the plurality of drive linkage engaging members with a corresponding grasping member of the at least two grasping members; and
   a positioning stop to engage an axially facing edge of the rotor.

19. A method of turning a rotor, the method comprising:
   frictionally grasping at least a portion of a substantially smooth exterior circumference of the rotor with a removable rotor grasping element, the removable rotor grasping element including:
      at least two grasping members configured to surround the at least a portion of the substantially smooth exterior circumference of the rotor, each grasping member of the at least two grasping members including a band body having a coupler for coupling adjacent ends of the at least one grasping members together and a friction element on an inner surface of the at least two grasping members to frictionally grasp the at least a portion of the substantially smooth exterior circumference of the rotor;
      a plurality of drive linkage engaging members configured to collectively surround the at least a portion of the substantially smooth exterior circumference of the rotor, each drive linkage engaging member of the plurality of drive linkage engaging members including a coupler for coupling with an adjacent drive linkage engaging member of the plurality of drive linkage engaging members; and
      a plurality of member couplers for coupling the least two grasping members to at least one drive linkage engaging member of the plurality of drive linkage engaging members;
   coupling a drive linkage to an exterior of the removable rotor grasping element and to a rotating drive shaft of a rotary driver; and
   turning the rotor by operating the rotary driver to move the drive linkage to impart a torque to the rotor with the removable rotor grasping element.

20. The method of claim 19, wherein each drive linkage engaging member of the plurality of drive linkage engaging members includes a sprocket member.

* * * * *